Dec. 23, 1952     S. G. BERGLUND ET AL     2,622,269
MEAT TENDERIZER
Filed July 24, 1948     4 Sheets-Sheet 1
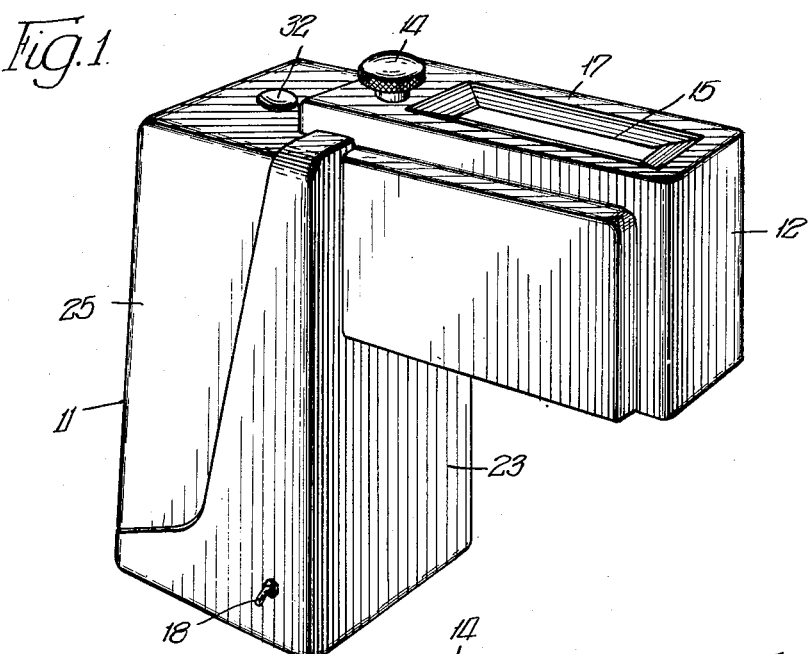
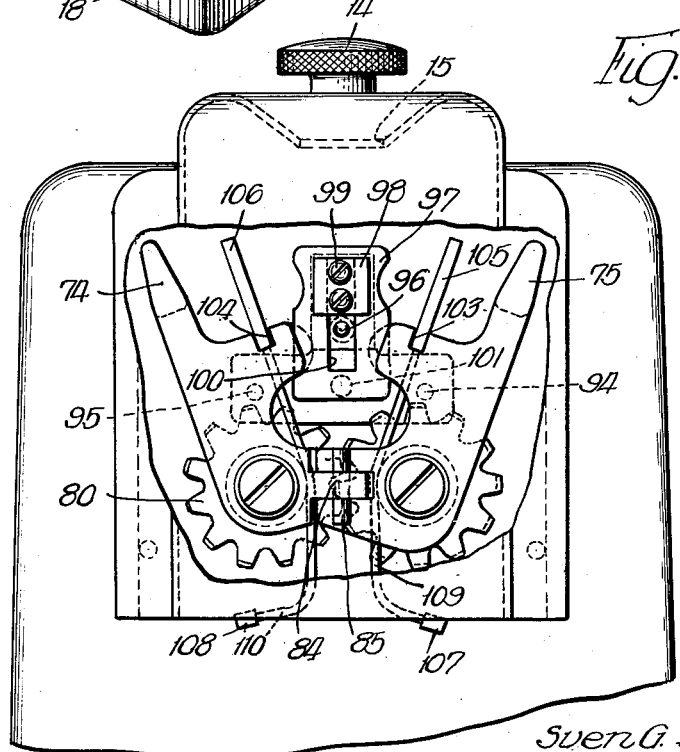
INVENTORS.
Sven G. Berglund.
BY Edward C. Karp,
Wilkinson, Huxley, Byron & Hume
Attys.

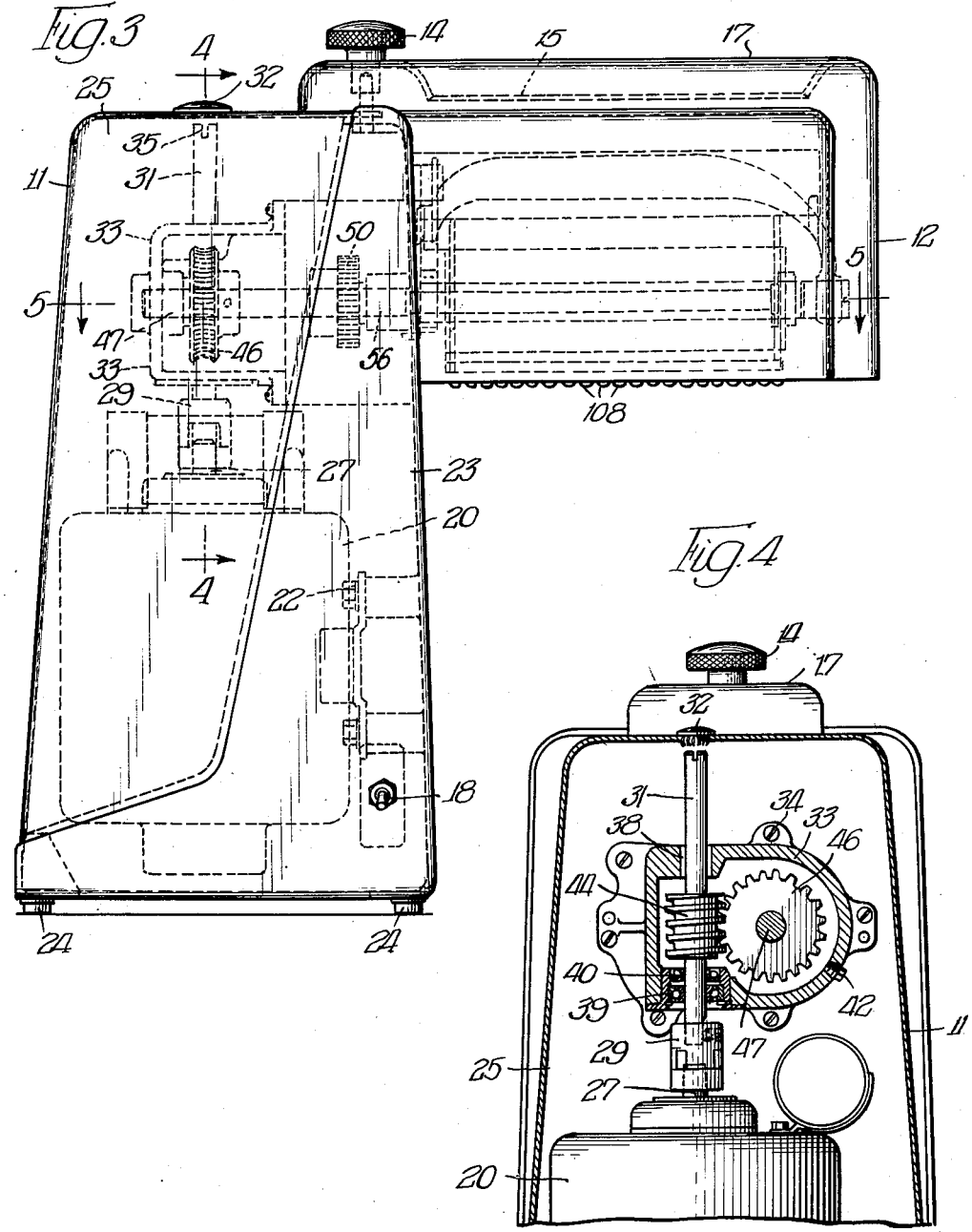

Dec. 23, 1952    S. G. BERGLUND ET AL    2,622,269
MEAT TENDERIZER
Filed July 24, 1948    4 Sheets-Sheet 3
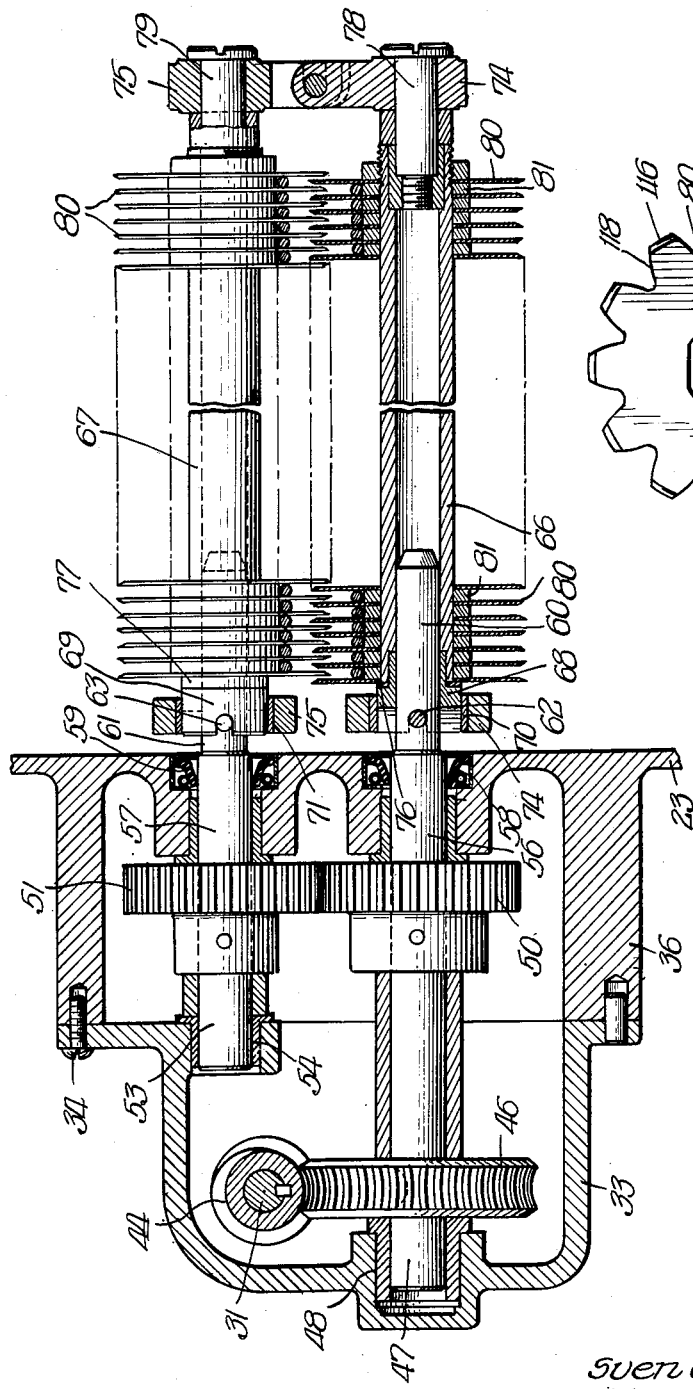
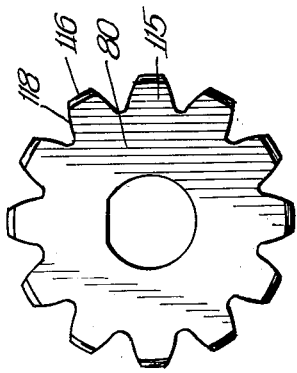
INVENTORS
Sven G. Berglund
BY Edward C. Karp Dec. 23, 1952 S. G. BERGLUND ET AL 2,622,269
MEAT TENDERIZER
Filed July 24, 1948 4 Sheets-Sheet 4
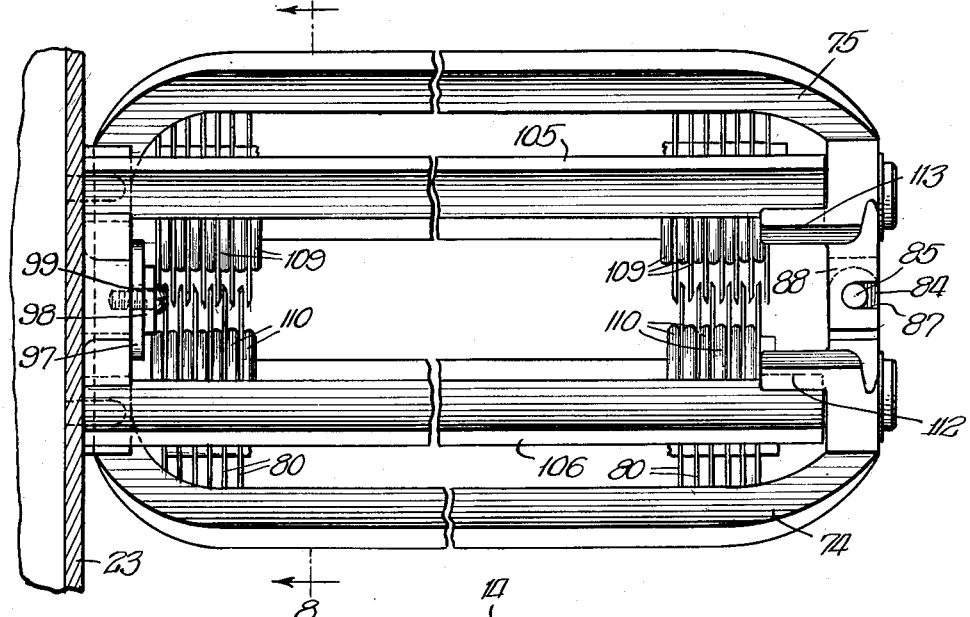
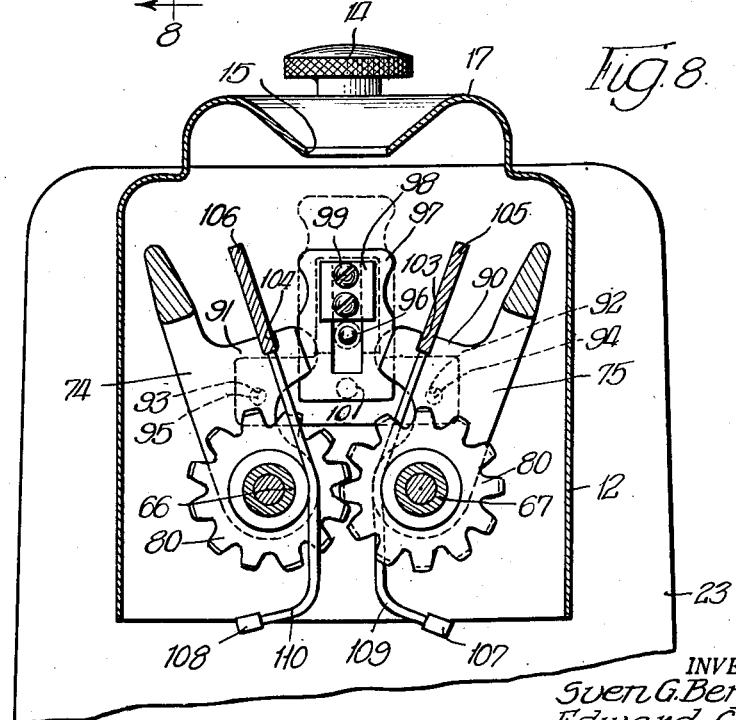
INVENTORS.
Sven G. Berglund
BY Edward C. Karp, Patented Dec. 23, 1952

2,622,269

UNITED STATES PATENT OFFICE 2,622,269

MEAT TENDERIZER

Sven G. Berglund, Rockford, and Edward C. Karp, Belvidere, Ill., assignors to Sanitary Scale Company, Belvidere, Ill., a corporation of Illinois Application July 24, 1948, Serial No. 40,586

6 Claims. (Cl. 17—26)

This invention relates to a new and improved tenderizer for meat or the like and more particularly to apparatus especially adapted for cutting and crushing the fibres of steaks or relatively flat pieces of meat.

Apparatus for this general purpose is well known in the art and in general comprise means for cutting, slitting or crushing the fibres in meat. By the use of such apparatus, the less expensive or tougher types of meat may be prepared so that they cook more satisfactorily, are more easily cut at the table and are more easily masticated.

Apparatus for general or commercial use for this purpose must conform to certain standards as to safety of operation and, also, as to sanitary aspects in operation. Adaptability for effective and thorough cleaning and sterilizing of all parts coming in contact with the food is essential.

It is an object of the present invention to provide a new and improved tenderizer for meat or the like.

It is a further object to provide a construction of this character in which the parts coming in contact with the meat may be readily dismantled, cleaned and reassembled.

It is also an object to provide a construction in which the operating members or cutters are carried by parallel shafts which are firmly supported and also capable of rapid disconnection from each other and the drive mechanism.

It is an additional object to provide such a construction in which the shafts are supported as cantilevers by the drive assembly, and in which their free ends are detachably locked together so as to prevent their separation by the meat or the like being worked upon.

It is another object to provide a construction comprising cutting and working disks, the cutting edges of which may be sharpened with a minimum of labor and without removing them from assembled relationship on their shafts.

It is a further object to provide a construction which is simple in design and operation and adapted for easy cleaning and maintenance.

Other and further objects will appear as the description proceeds.

We have shown certain preferred embodiments of our invention in the accompanying drawings, in which —

Figure 1 is a perspective view showing the machine;

Figure 2 is an enlarged end view of the operating mechanism as seen from the right of Figure 1, the end of the housing being broken away;

Figure 3 is a front elevation of the machine, the working parts being shown in broken lines;

Figure 4 is a fragmentary elevation, partly in section, showing the motor drive assembly, and taken on line 4—4 of Figure 3;

Figure 5 is a horizontal view, partly in section, taken on line 5—5 of Figure 3;

Figure 6 is a face view of a cutter disk;

Figure 7 is a plan view of the blade and shaft assembly and their supporting members; and Figure 8 is a section taken on line 8—8 of Figure 6.

The general assembly of the tenderizer is shown in Figure 1, the shaft driving assembly being enclosed in the housing 11 and the cutter shafts and cutters being housed in the tenderizer hood 12 which is secured to the housing of the driving assembly by the hood locking knob 14 which is connected to a threaded member, not shown, which is threaded into an opening in the top of the housing 11. The tenderizer hood 12 is provided with the opening 15 for receiving the meat to be treated, a portion of the upper face of the hood sloping from all sides toward the opening 15, as shown at 17. The control switch 18 serves to turn on and off the drive motor.

The relationship of the parts is shown in Figure 3 where the internal operating mechanism is indicated in broken lines. The drive motor 20 is placed with its shaft extending vertically, and is secured by means of bolts 22 to the inner face of the main fixed portion 23 of housing 11. This fixed portion 23 carries the supporting feet 24 on its lower face. The housing is provided with a removable section 25 by the removal of which the various drive parts may be reached for adjustment or repair.

The central shaft 27 of motor 20 is connected by coupling 29 to a worm drive shaft 31 which is supported in a gear housing 33 secured by screws 34 to inwardly extending walls 36 which form a part of the main housing member 23. The housing section 25 is provided with an opening above the worm shaft 31 covered by the removable closure 32. The upper end of the shaft 31 is slotted, as shown at 35, so that it may be turned manually by means of a screw driver or other suitable tool. These details of construction are shown in Figures 3, 4 and 5. The worm drive shaft 31 is supported in the gear housing 33 by a plain bearing 38 in its upper portion and by ball bearing 39 in its lower portion. An oil retaining ring 40 is fitted above the ball bearing 39. Oil or grease may be introduced in the gear housing 33 through the plug 42. The worm 44 carried on shaft 31 meshes with the worm gear 46 mounted on the horizontal stub shaft 47. The stub shaft 47, as best shown in Figure 5, has its rear end mounted in a bearing 48 in the gear housing 33. It carries the spur gear 50 which meshes with a similar spur gear 51 on a shorter driven stub shaft 53. This stub shaft 53 has its rear end fitted in a bearing 54 also carried by the gear housing 33.

The forward portions 56 and 57 of stub shafts 47 and 53 are similar and extend horizontally from the face of the housing member 23, passing through oil retaining rings 58 and 59. Beyond the face of housing 23, the stub shafts have reduced portions 60 and 61 which are similar and which carry, respectively, the similar drive pins 62 and 63. The tubular cutter shafts 66 and 67 have internal openings of a diameter to closely fit on the reduced stub shaft portions 60 and 61. These shafts are provided with the enlarged rear bearing portions 68 and 69 which fit in bearings 70 and 71 carried by the cutter frames 74 and 75. The opposite or outer free ends of the cutter shafts 66 and 67 also fit in bearings on the cutter frames 74 and 75, these shafts being provided with reduced bearing members 78 and 79. As shown in Figures 5, 7 and 8, the cutter shafts are provided with a plurality of cutting disks 80 uniformly spaced by means of the spacing rings 81. In order that the cutting disks 80 on the two shafts may be positively located so as to be spaced to interfit uniformly, a narrow spacing sleeve 76 is provided on shaft 66 and a wider spacing sleeve 77 is provided on shaft 67.

As best shown in Figures 3, 7 and 8, the cutter frames 74 and 75 are of an elongated U shape with the legs of the U extending downwardly and providing the bearings for the ends of the cutter shafts. These cutter frames are essentially cantilever beam construction. The cutter frame 74, as shown in Figures 2 and 7, has an inwardly extending reduced portion 84 carrying a pin 85 which fits into notches 87 in the mating bifurcated portions 88 of the cutter frame 75, thus holding the unsupported ends of the cutter frame against lateral separation due to any thrust caused by meat passing through the tenderizer shafts. The inner ends of the cutter frames are provided with inwardly extending flat bracket portions 90 and 91 having circular openings 92 and 93 fitting, respectively, studs 94 and 95 which extend from the face of the housing 23.

The vertically movable locking slide or latch 97 is supported and held against the face of housing 23 by the guide member and stop 98 which is secured to member 23 by screws 99. The internal slot 100 formed in the member 97 guides and limits its movement on the member 98. The spring pressed detent ball 96 on the housing 23 fits into a socket 101 formed on the lower rear portion of the slide 97 to yieldingly hold it in its upper or unlatched position. As best shown in Figures 2, 7 and 8, this locking member 97 fits in front of the inner portions of the brackets 90 and 91 which extend inwardly from the cutter frames 74 and 75. These cutter frames are held in position against rotation about the axis of the cutter shafts 66 and 67 by means of the pins 92 and 93 and against longitudinal movement away from the housing 23 by means of this latch plate 97.

The bracket portions 90 and 91 are notched at 103 and 104 to receive the upper flat bar portions 105 and 106 of the stripper combs which guide the meat through and away from the tenderizing blades. These combs include the lower narrow bars 107 and 108 to which the wires 109 and 110 extend downwardly between the cutter blades 80. The opposite ends of the bar portions 105 and 106 are supported in notches similar to notches 103 and 104 formed in the inwardly extending lugs 112 and 113 which are part of the cutter frames 74 and 75, as best shown in Figure 7. These two stripper combs are provided with lower portions inclined away from each other and extending under the cutter disks 80. These portions form a guard for the under side of the disks and prevent a hand thrust into the under side of the apparatus from being injured by the cutters. These return bends also prevent the meat from hanging up on the lower edges of the combs.

A cutter disk is shown in enlarged elevation in Figure 6. These blades are shown in plan view in Figures 5 and 7. They comprise flat disks of knife steel with spaced teeth 115. Each tooth has its outer circumferential edge beveled, as shown at 116. These outer edges of the teeth constitute portions of a circular arc based on the axis of rotation of the disks. The inwardly extending edge portions 118 of the teeth 115 are not beveled, but are flat and present the full width of the material from which the blades are formed. It will be noted, from Figures 5 and 7, that these cutter disks are oppositely faced so that, as shown at the left of these figures, the first two cutter blades have their bevels facing inwardly toward each other and each pair thereafter is similarly faced. This single bevel extends from one face to the other, and the location with adjacent bevels oppositely facing facilitates sharpening the edges. A suitably formed file or whetstone or other sharpening device may be held between the pair of oppositely facing blades while the blades are rotated and the blades thus quickly sharpened. This necessitates only half as many sharpening operations as would be necessary were each blade formed with a double bevel. The blades of the form shown have proven efficient in actual operation.

The method of operation of the device will be readily understood from the description of the construction. With the machine assembled as shown, when the drive motor is turned on by means of switch 18, the motor revolves and, by means of coupling 29, worm 44 and worm gear 46, the longer stub shaft 47 is rotated in the clockwise direction, as seen in Figures 2 and 8, so that the teeth of the disks 80 rotate downwardly toward the similar teeth carried by the opposite shaft. The shorter stub shaft 53 is driven from shaft 47 by gear 51 meshing with similar gear 50 so that shaft 57 rotates in the counterclockwise direction. The cutter shafts 66 and 67 are caused to rotate with the stub shafts 47 and 53 by means of the pins 62 and 63 which fit in the corresponding notches in the end portions 68 and 69 of the shafts 66 and 67. The meat to be treated is fed through the opening 15 in the top of the tenderizer hood 12 and passes between the blades 105 and 106 and down between the comb wires 109 and 110. It is caught by the teeth of the disks 80 and carried through and below the disks 80, being guided in its movement by the lower portions of the comb wires 109 and 110. Any suitable receptacle is placed below the laterally extending operating members to receive the meat after treatment. The meat is slit by the sharpened cutting edges and the fibres are crushed by the flat sloping edges of the teeth.

In order to clean the parts coming in contact with the food, the tenderizer hood 12 is loosened by turning the hood locking knob 14 and the hood is lifted clear of the cutter bearings and cutter frames. The latch member 97 is then lifted until it is held in its upper position by the ball detent 96 and the entire cutter assembly removed by sliding it to the right, as seen in Figure 3, until the cutter shafts 66 and 67 clear the reduced ends 60 and 61 of the stub shafts 47 and 53. The combs 105 and 106 may be removed by lifting them out of their respective sockets so that these combs may be separately cleaned. The two cutter shafts still supported in the cutter frames may be separated from each other by swinging them apart about the axis of the locking pin 85 until the notches 87 may be slipped off the pin 85 without the overlapping cutter disks interfering with each other. Careful handling of the sharp cutter disks is required, and they are in part guarded and readily handled by means of the immediate portions of the U-shaped cutter frames 74 and 75. All parts contacting the food may then be sterilized by any suitable method and kept in entirely sanitary condition. The operating parts are replaced by reversal of the procedure above described.

The cutter blades may be easily and rapidly sharpened when needed by removing the cover 12 and putting the machine in operation. Suitable sharpening means may then be held successively between each pair of cutters with inwardly facing bevels, thus sharpening two blades at each step of the process.

While we have shown certain preferred embodiments of our invention, these are to be understood to be illustrative only as it is capable of variations to meet differing conditions and requirements, and we contemplate such modifications as come within the spirit and scope of the appended claims.

We claim:

1. A meat tenderizer or the like comprising a housing, drive mechanism within said housing having a pair of power shafts projecting from a side of said housing in spaced relation, a pair of cutting devices each comprising a frame having spaced aligned journals and a shaft having cutters thereon journaled adjacent each of its ends in the journals of each of said frames, means associated with said frames for separably joining them together, other means coactive between the frames and the housing detachably connecting the joined frames to said side of the housing to bring the cutter shafts and power shafts into drive-communicating relationship and to support the joined frames as a cantilever from said side of the housing.

2. A meat tenderizer or the like comprising a housing, drive mechanism within said housing providing a pair of power take-off shafts extending from a side of the latter in spaced relation, a pair of cutting devices each having a frame with spaced aligned journals and a cutter shaft journaled adjacent its ends in the journals of each frame, interlocking means carried upon adjacent ends of each frame separably joining them together in pivotal relationship, and means adjacent the opposite ends of said frames for detachably securing the joined frames to said side of the housing to bring the cutter shafts and power shafts into drive-communicating relationship, said securing means holding the joined frames to said side of the housing to support the frames as a cantilever extending from the housing.

3. A meat tenderizer or the like having an up-standing shaft driving assembly providing a pair of substantially horizontally disposed power take-off shafts at a side thereof, in combination with a tenderizing device removably mounted upon the shaft driving assembly in cooperative relation with said shafts comprising a pair of frames detachably connected together at adjacent ends, each frame having spaced shaft journals, a shaft journaled in each frame, said shafts carrying meat tenderizing means between their journals in the frames, means detachably securing the joined frames in rigid relation to the power take-off side of the shaft driving assembly, said joined frames extending from said side of the assembly as a cantilever, and drive transmission means connecting at least one of the power take-off shafts and one of the shafts carried by the frames.

4. In a meat tenderizer and the like, a shaft driving assembly having a pair of driving shafts upon a lateral face thereof, a cutting device comprising a pair of yoke frames having aligned journals at their opposite ends, a pair of cutter shafts journaled, respectively, in said aligned journals of each frame, a plurality of rotary cutters associated with each shaft in offset, overlapping relation to each other, interlocking members for connecting said frames to the lateral face of the shaft driving assembly to present the cutter shafts in alignment with the driving shafts, and separable means cooperating between the free ends of said frames for rigidly holding them together in operative relation.

5. In a meat tenderizer and the like, a shaft driving assembly having a pair of stub driving shafts projecting from a lateral face thereof, a cutting device comprising a pair of rigid yoke frames having aligned journals at their opposite ends, a pair of cutter shafts journaled, respectively, in the journals of each frame, a plurality of rotary cutters carried by each cutter shaft, interlocking means at an end of said frames for rigidly holding them together in separable, pivotal relationship, interfitting positive clutch elements engaged upon axial movement of said cutting shafts toward said stub driving shafts disposed in drive transmitting relation between axially aligned shafts, and a latch carried by the shaft driving assembly and engaging the yoke frames in joined relationship to lock the aligned shafts together.

6. Meat tenderizing apparatus comprising an up-standing power mechanism presenting a stub drive shaft at a side thereof, a housing for said mechanism having an opening to accommodate said stub shaft, a cutter assembly comprising a pair of yoke frames detachably joined together, a pair of cutter shafts carrying cutters journaled, respectively, in each of said yoke frames in parallel relation, means connecting at least one of said cutter shafts to said stub shaft to impart drive to the cutter assembly, a fastening mechanism coactive between said housing and one end of said joined yoke frames adjacent to said stub drive shaft for rigidly locking the cutter assembly to said housing to maintain said shafts in connected relation, and a removable cover cooperating with said housing to enclose said cutter having an opening at its top and bottom defining a passageway to and through said cutters for the accommodation of pieces to be treated.

SVEN G. BERGLUND.
EDWARD C. KARP.

REFERENCES CITED

The following references are of record in the file of this patent:

UNITED STATES PATENTS

| Number | Name | Date |
|---|---|---|
| 2,007,464 | Wood | July 9, 1935 |
| 2,290,812 | Norman | July 12, 1942 |
| 2,346,686 | Jackson | Apr. 18, 1944 |
| 2,360,729 | Spang | Oct. 17, 1944 |
| 2,364,533 | Jackson | Dec. 5, 1944 |
| 2,409,463 | Ahrndt | Oct. 15, 1946 |
| 2,561,867 | Jackson | July 24, 1951 |